United States Patent [19]

Baranski

[11] Patent Number: 4,983,914
[45] Date of Patent: Jan. 8, 1991

[54] PROXIMITY MEASUREMENT BY INDUCTIVE SENSING USING SINGLE TURN UHF ENERGIZED COIL SENSORS INCORPORATED INTO CUTTER HEAD OF SHEEP SHEARING DEVICE

[75] Inventor: Jan Baranski, Perth, Australia

[73] Assignee: The University of Western Australia, Nedlands, Australia

[21] Appl. No.: 500,100

[22] Filed: Mar. 28, 1990

Related U.S. Application Data

[63] Continuation of Ser. No. 102,204, Sep. 29, 1987, abandoned.

[30] Foreign Application Priority Data

Sep. 29, 1986 [AU] Australia .................. PH8260

[51] Int. Cl.[5] ................ G01B 7/14; B26D 5/00
[52] U.S. Cl. ................ 324/207.16; 324/207.22; 324/207.26; 324/234; 324/236; 30/194
[58] Field of Search ............ 324/207, 208, 207.16, 324/207.22, 207.26, 230, 234, 236–238; 340/551, 686; 331/65; 361/179, 180; 328/1, 5

[56] References Cited

U.S. PATENT DOCUMENTS

| | | | |
|---|---|---|---|
| 2,887,651 | 5/1959 | Piip | 324/230 |
| 3,217,204 | 11/1965 | Nance | 324/236 X |
| 3,234,461 | 2/1966 | Trent et al. | 324/234 X |
| 3,255,405 | 6/1966 | French | 324/234 |
| 3,381,217 | 4/1968 | Williamson et al. | 324/236 |
| 3,407,352 | 10/1968 | Smith | 324/230 |
| 3,473,111 | 10/1969 | Leersnijder et al. | 324/236 |
| 3,815,016 | 6/1974 | Nix et al. | 324/230 |
| 3,967,064 | 6/1976 | Sigworth | 328/1 |
| 4,001,718 | 1/1977 | Wilson et al. | 324/236 |
| 4,042,876 | 8/1977 | Visioli, Jr. | 324/207 |
| 4,160,204 | 7/1979 | Holmgren et al. | 324/207 |
| 4,219,740 | 8/1980 | Little | 340/686 X |
| 4,333,052 | 6/1982 | Schmall | 324/236 X |
| 4,706,020 | 11/1987 | Viertl et al. | 324/238 |

FOREIGN PATENT DOCUMENTS

| | | |
|---|---|---|
| 32064/85 | 2/1985 | Australia . |
| 35303/85 | 5/1985 | Australia . |
| 0080086 | 4/1986 | Japan .................. 324/236 |

OTHER PUBLICATIONS

Les Capteurs en Instrumentation Industrielle, G. Asch et al., Paris: Bordes, 1982, pp. 360–365, Capteurs de Proximite.

Sensoren–Fühler der Messtechnik, Günther W. Schantz, Heidelberg: Hüthig, 1986; pp. 378–383: Induktive Näherungsschalter.

Primary Examiner—Gerard R. Strecker
Attorney, Agent, or Firm—Nixon & Vanderhye

[57] ABSTRACT

An inductive sensing arrangement enables the distance of the cutting head of an automated sheep shearing apparatus from the skin of a sheep to be determined. Sensors on the cutting head include a coil, the inductance of which varies in accordance with the distance of the coil from a conductive surface such as the skin of a sheep. An output voltage represents the distance of the coil from the conductive surface.

17 Claims, 4 Drawing Sheets

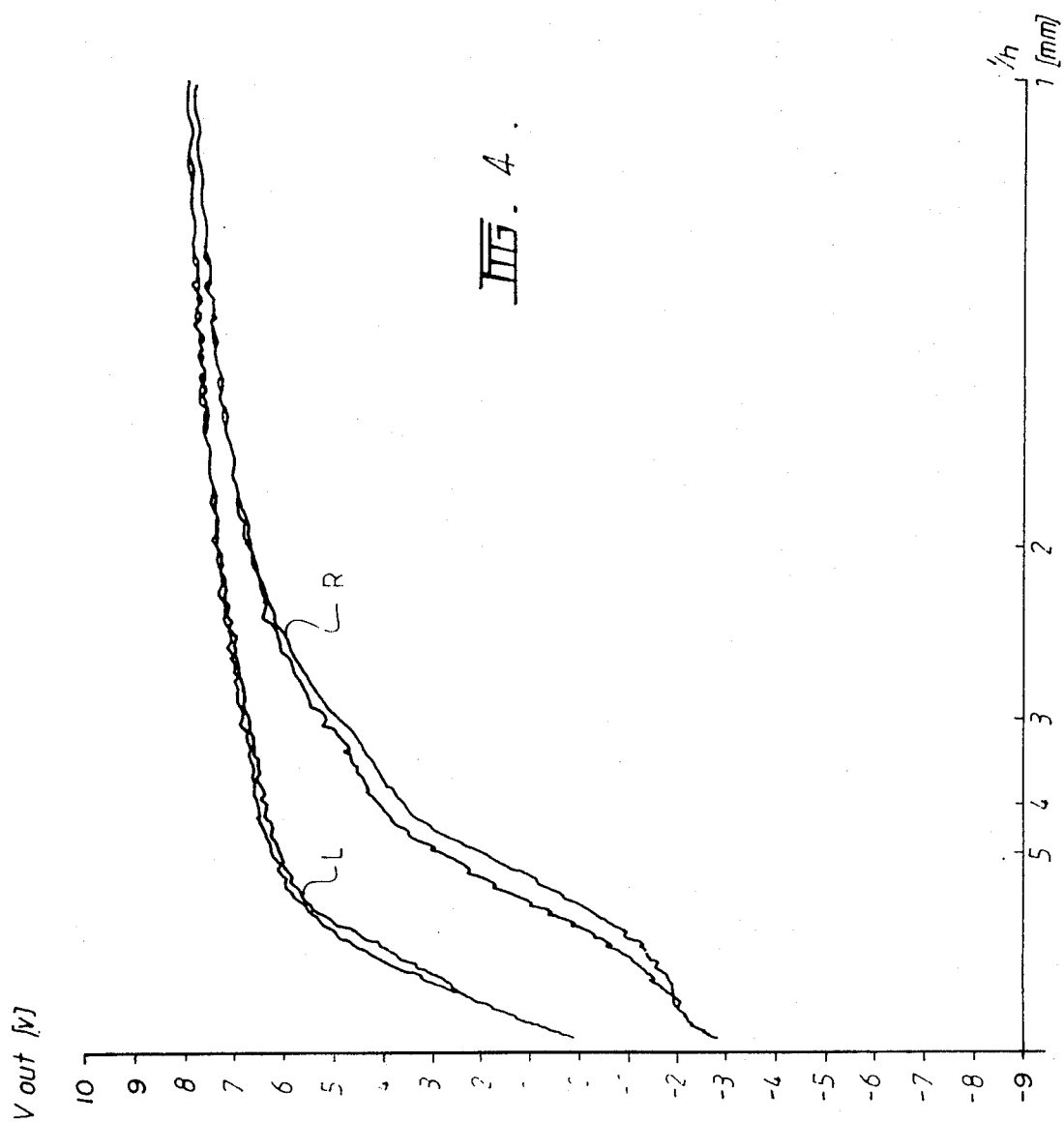

PROXIMITY MEASUREMENT BY INDUCTIVE SENSING USING SINGLE TURN UHF ENERGIZED COIL SENSORS INCORPORATED INTO CUTTER HEAD OF SHEEP SHEARING DEVICE

This is a continuation of application Ser. No. 07/102,204, filed Sept. 29, 1987, now abandoned.

BACKGROUND OF THE INVENTION

1. Field of the Invention

This invention relates to remote sensing, and in particular relates to proximity sensing in automatically controlled operations, for example in sensing the position of a shearing head, in relation to the skin of a sheep, in an automated sheep shearing system.

2. Description of the Prior Art

In AU-A-32064/84, capacitance proximity sensing in automated sheep shearing systems is described, and AU-A-35303/84 relates to the use of resistance proximity sensing in such systems.

BRIEF SUMMARY OF THE INVENTION

It is an object of this invention to provide an alternative form of proximity sensing.

The invention provides an inductive sensing arrangement including means for processing information relating to inductance changes resulting from the change in proximity relative to a surface, to produce data on the distance of said surface.

The invention also provides an arrangement characterized in that the distance of said surface is represented by a voltage across a tuned circuit.

The invention further provides a method of determining the proximity of a surface, including the steps of detecting the change in inductance which results from a change in proximity, and processing information representing said inductance change to provide a representation of the distance from the said surface.

Preferably, said arrangement includes a coil capable of generating a magnetic field, and said means operates to determine the inductance change of said coil resulting from the induction of an eddy current coil in the material of said element.

BRIEF DESCRIPTION OF THE DRAWINGS

FIG. 4 is a graph of $V_{OUT}$ plotted against $1/h$.

DETAILED DESCRIPTION OF THE PREFERRED EMBODIMENT

The inductive sensor of the present invention utilizes the eddy currents phenomenon. When a magnetic field is produced in the vicinity of a material characterized by conductivity $\gamma$ and permeability $\mu$ part of this field penetrates into the material to the conventional depth of $$\delta \sqrt{\frac{2}{\omega \mu \gamma}} \tag{1}$$

The field induces eddy currents in the material, which have circular paths parallel to the material surface 10. If the source of the magnetic field and in turn the eddy currents is a coil 12, these currents will change the inductance of the coil 12. Assuming that the coil is of a single circular loop made from a wire of small section and the surface conductivity is high, the exciting coil 12 will induce an effective eddy current coil 14 of the shape shown in FIG. 1, mirroring the shape of exciting coil 12. The mutual inductance of the two coils is mathematically described as:

$$M = \frac{2\mu_0 r}{K} \left[ \left( 1 - \frac{k^2}{2} \right) J(k) - K(k) \right] \tag{2}$$

where:

$$K = \frac{4r^2}{4r^2 + d^2},$$

Figure 1:
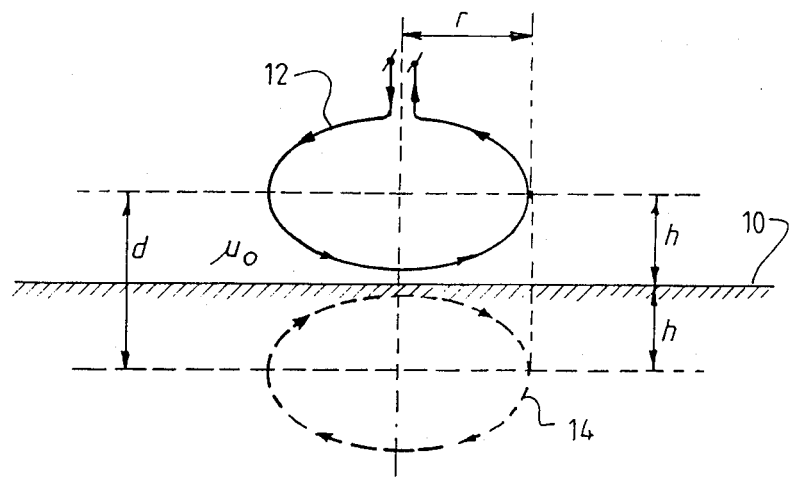
FIG. 1 is a diagram relating to the theoretical basis of the invention.

J(k) and K(k)—elliptic integrals of first and second order; r, d, h as in FIG. 1.

A complete description of the inductance change is only possible for small distances (h<<r)

$$\Delta L = \frac{1}{\mu \gamma \delta} \left[ \frac{\partial M}{\partial h} \right] - M \tag{3}$$

Figure 2:
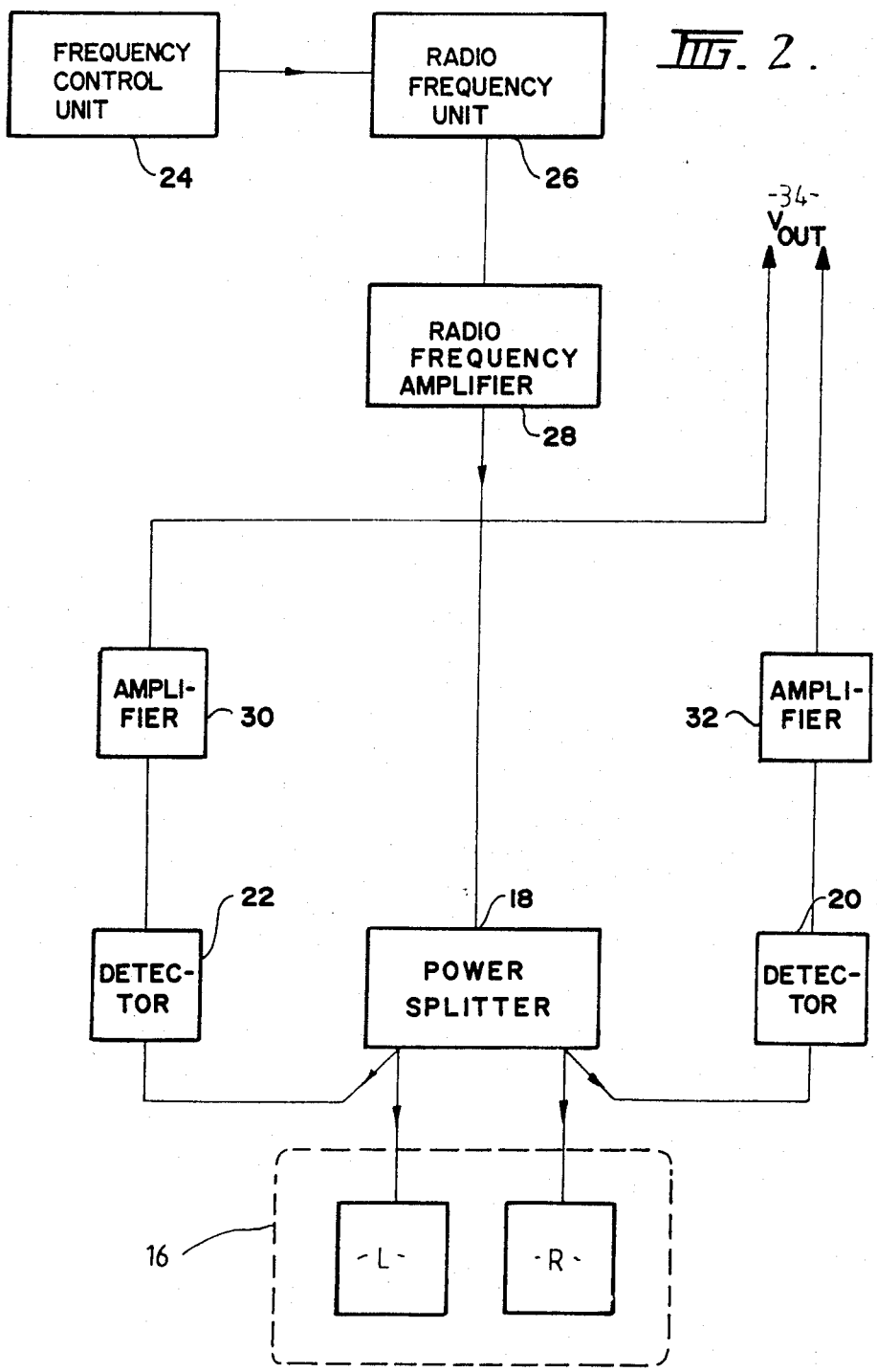
FIG. 2 is a block diagram of one embodiment of a two-sensor inductance sensor arrangement according to the invention.
Figure 3:
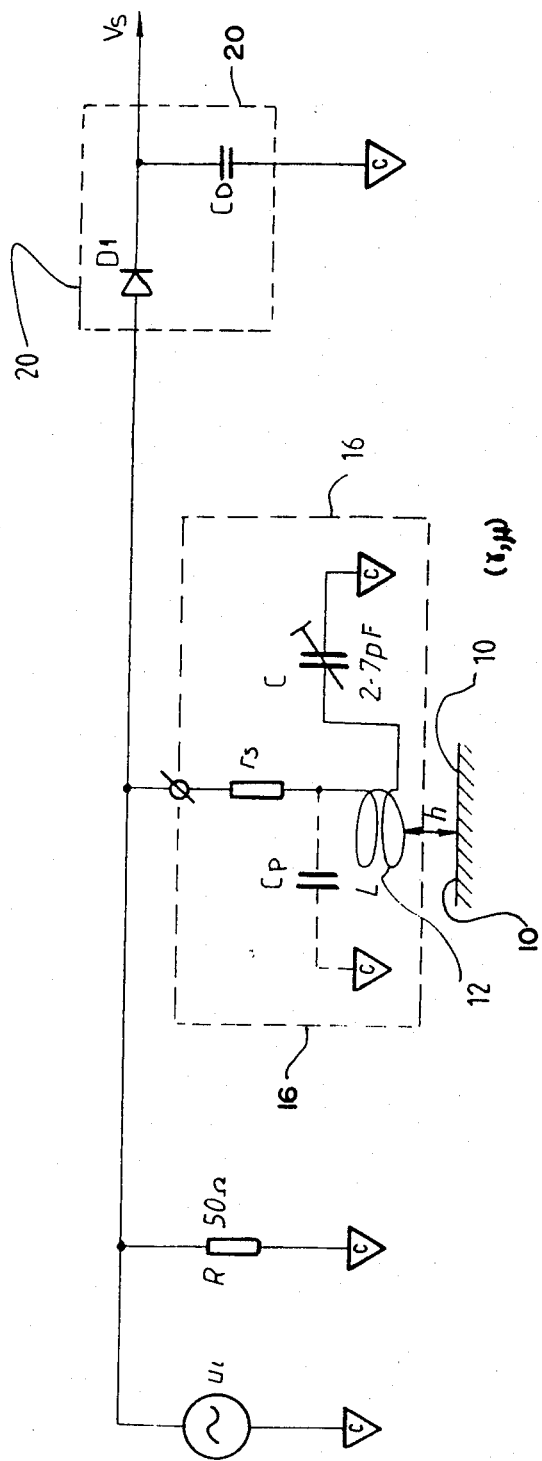
FIG. 3 is a more detailed diagram of one sensor channel of the arrangement of FIG. 3.

Turning now to FIGS. 2 to 4, the sensor package 16 consists of two sensors placed side by side, designated functionally 'left' (L) and 'right' (R), which are part of the inductance sensing system shown on FIG. 2. The package was designed to fit the cutter head of a sheep shearing robot. IT is suggested that a third, 'back', sensor could be added (reference the three capacitance sensors of AU-A-32064/84) and that the system could be integrated by including the power splitter 18 and detectors (20, 22) in the sensor package 16.

A frequency control unit 24 feeds into a and contols the frequency of a radio frequency plug-in unit 26, preferably at HP 86220A. Radio frequency amplifier 28 (preferably involving mini-circuits ZHL-2-12) feeds to power splitter 18 (preferably MCL ZFSC-4-1, which in turn feeds to the sensor package.

Detectors 20, 22 for right and left sensors R and L respectively have their signals amplified by amplifiers 30, 32 respectively, which produces $V_{OUT}$ for each sensor, for supply to a data acquisition system 34.

FIG. 3 shows a single sensor channel where $U_i$ is the powering signal, R is the characteristic impedance of the splitter 18, and Dl and $C_D$ form a RF detector 20. In the sensor package there is a single turn coil 12, printed on double-sided copper-clad epoxy glass board (not shown) which is connected in series with a capacitance trimmer C to form a tuned circuit, Cp representing a parasitic capacitance. A parallel arrangement of the circuit is also possible, although in such an arrangement the influence of the parasitic capacitance is much bigger.

The other side of the board is grounded and there is a radial Faraday shield in front of each sensor.

The self inductance of the single turn coil 12 is affected by the ground plane according to equation (3) as used for proximity measurement, so the resonant frequency had to be found experimentally. It is desirable to use a high operating frequency to decrease the depth of penetration ($\delta$) and increase the change of inductance; one frequency used in experiments was in the vicinity of 830 MHz.

When the sensor approaches a conductive material 10 the value of inductance L decreases, the circuit gets out of tune, which changes the voltage across the circuit. In experiments, the measured change of Vs was approximately 1.5 V over a distance of 60 mm.

FIG. 4 shows characteristics of the sensor measured on the outputs ($V_{OUT}$) of the amplifiers 30, 32.

The nature of fleece, especially near the skin 10, of a sheep, suggests an electrical anisotropy. When the surface conductivity is considered, the weakest properties are found on any plane locally parallel with the skin. Such a position naturally corresponds with a normal cutter position during sheep shearing. The inductive sensor discriminates between the surface conductivity of the sheep's skin and the wool surface conductivity. This significantly decreases sensitivity to the wool conditions.

The sensor of this invention can be tuned to different working points on the resonant characteristic and to different resonant frequencies. A 'band sensitivity' can be obtained to detect materials only from a certain range of conductivity and permeability. The inductive sensor can also be employed directly for conductivity and permeability measurement.

I claim:

1. Apparatus for measuring the proximity of an object to a surface of low conductivity material, comprising at least one sensor located on said object, said sensor including a single turn coil connected in a tuned circuit, the inductance of said coil varying in accordance with changes in said proximity, and RF means coupled to said tuned circuit for applying a UHF RF signal in the vicinity of 830 MHz to said tuned circuit, and for detecting at the output of said tuned circuit a voltage amplitude representing said proximity.

2. Apparatus according to claim 1, wherein said coil is connected in series with a capacitor trimmer.

3. Apparatus according to claim 1, further including a pair of sensors oriented in side-by-side relationship.

4. Apparatus for measuring the proximity of an object to a surface of low conductivity material, comprising at least one sensor located on said object, said sensor including a single turn coil connected in a tuned circuit, the inductance of said coil varying in accordance with changes in said proximity, and RF means coupled to said tuned circuit for applying an RF signal to said tuned circuit, and for detecting at the output of said tuned circuit a voltage amplitude representing said proximity, and further including a pair of sensors oriented in side-by-side relationship, wherein said sensors are incorporated into a cutter head of a sheep shearing device, and wherein said surface comprises the skin of the sheep.

5. A method for measuring the proximity of an object to a surface comprising:
(a) providing at least one single turn coil in a tuned circuit having a predetermined shape for inducing an eddy current flow path in said surface, said eddy current flow path mirroring said predetermined coil shape;
(b) detecting changes in the inductance of said coil as said proximity varies, including the steps of applying a UHF RF frequency sensing voltage across in the vicinity of 830 MHz to said tuned circuit and sensing voltage across said tuned circuit; and
(c) representing proximity of said coil with said surface in response to said sensed voltage.

6. A method according to claim 5 wherein the change in inductance is determined by the following equation:

$$\Delta L = \frac{1}{\mu \gamma \delta} \left[ \frac{\partial M}{\partial h} \right] - M$$

where $\mu$ is the permeability of the surface; $\gamma$ is the conductivity of the surface; $\delta$ is the depth of penetration of the eddy current in the surface; M is the mutual inductance; and h is the distance between the surface and a center of the eddy current coil.

7. An automated sheep shearing apparatus including:
a cutter head,
an inductive sensing arrangement including a sensor package located on said cutter head, said package including a pair of sensors, each of said sensors including a single turn coil connected in series with a capacitance trimmer to form a tuned circuit,
means coupled to said sensors for applying RF signals to each said coil, and
means coupled to said sensors for detecting voltage changes across each said tuned circuit and for determining the distance between the cutter head and the skin of the sheep in response to said detected voltage changes.

8. The inductive sensing arrangement as defined in claim 7 wherein said detecting means includes means for amplifying each of said sensor generated signals and data acquisition means for receiving and acquiring said amplified signals.

9. Apparatus as in claim 7 wherein:
each said coil comprises a planar coil having a single turn; and
said applying means includes radio frequency generating means coupled to said sensors for generating a very high frequency alternating current signal and for applying said alternating current signal to said sensors, and
said coil discriminates between wool and sheep skin in proximity to said coil.

10. Apparatus as in claim 9 wherein:
said coil comprises a planar coil having a single turn;
said tuned circuit further comprises a capacitance connected in series with said coil to form a resonant circuit;
said RF means includes radio frequency generating means coupled to said tuned circuit for generating a UHF RF alternating current signal and for applying said alternating current signal to said tuned circuit; and
said coil discriminates between wool and sheep skin in proximity to said coil.

11. A method as in claim 5 wherein:
said providing step (a) comprises providing a planar coil having a single turn connected tin series with a capacitance to form a series resonant circuit; and
said method further includes applying a UHF alternating current signal to said series resonant circuit and discriminating between wool and sheep skin in proximity to said coil.

12. Apparatus for sensing sheep skin proximity, said apparatus comprising:
   a printed circuit board having a planar single turn coil printed on one surface thereof;
   a trimmer capacitor electrically connected in series with said coil, said series-connected coil and capacitor together forming a series resonant tuned circuit resonating at a UHF radio frequency;
   RF generating means coupled to said tuned circuit for applying a UHF radio frequency signal in the vicinity of 830 MHz to said tuned circuit; and
   signal detecting means, coupled to said tuned circuit, for measuring the amplitude of the voltage present across said tuned circuit and for determining the proximity of said coil to said sheep skin in response to said measured voltage amplitude.

13. Apparatus as in claim 12 wherein:
   said UHF radio frequency signal is at a frequency corresponding to the resonant frequency of said tuned circuit, proximity between said coil and said sheep skin changing the inductance of said coil and thereby detuning said tuned circuit from said resonant frequency.

14. Apparatus as in claim 12 wherein:
   said coil induces eddy current to flow through said sheep skin in a path mirroring the path said UHF radio frequency signal flows through said coil; and
   said eddy current flow changes the inductance of said coil.

15. Apparatus as in claim 14 wherein said inductance change is dependent upon the mutual inductance between said eddy current path and said coil.

16. Apparatus as in claim 12 further including a ground plane conductive surface disposed on another surface of said printed circuit board.

17. Apparatus as in claim 12 further including a radial Faraday shield operatively coupled to said coil.

* * * * *